INFORMATION HANDLING APPARATUS

Filed Nov. 5, 1958 4 Sheets-Sheet 1

INVENTOR.
ALAN J. DEERFIELD
BY Henry L. Hanson
ATTORNEY

Feb. 7, 1961 A. J. DEERFIELD 2,971,056

INFORMATION HANDLING APPARATUS

Filed Nov. 5, 1958 4 Sheets-Sheet 4

United States Patent Office 2,971,056

Patented Feb. 7, 1961

2,971,056

INFORMATION HANDLING APPARATUS

Alan J. Deerfield, Franklin, Mass., assignor to Minneapolis-Honeywell Regulator Company, Minneapolis, Minn., a corporation of Delaware Filed Nov. 5, 1958, Ser. No. 772,053

10 Claims. (Cl. 178—23)

A general object of the present invention is to provide a new and improved checking circuit for use with an information handling apparatus. More specifically, the present invention is concerned with a checking apparatus for checking the performance of a circuit used in the transfer and conversion of data to a printer or like device where such apparatus is characterized by its ability to check the performance of the transfer circuitry as well as the performance of the printer associated therewith.

While the present invention has utility in many areas of digital data processing, the area hereinafter more specifically described relates to digital data processing and circuitry associated with a digital output device, such as a printer or a punch. In digital data processing systems, data is normally stored in or transferred within the system in the form of selected digital codes. Such codes may or may not be compatible with the apparatus associated with an output device. Consequently the circuits feeding an output device may well incorporate decoders and digital manipulators for deriving the selected coded characters which are compatible with the output device and also arranged the digital data in a desired format. In order to insure the accurate performance of such circuits, it has been found desirable to provide checking means to determine if the coded character to be printed was in fact selected at the output device.

A more specific object of the present invention is therefore to provide a digital operation checking circuit for a printer apparatus where a check is made to determine if a particular digital character to be printed was in fact selected to be printed at the printer.

When the principles of the present invention are applied to printer apparatus, sometimes referred to as a "line-at-a-time" printer, the operation of the printing circuitry is inherently high speed. When a full line of print is being printed, it is quite possible that more than one particular character may be selected to be printed in a particular line. When a plurality of light characters are selected for printing in a particular line of print, special provisions must be made in the checking circuitry to insure that an accurate check is made of the printer performance.

It is accordingly a further object of the present invention to provide a new and improved checking circuit for an output device which is adapted to operate with a plurality of like characters at the same time in conjunction with a particular output operation.

As will be apparent from the description that follows, the present invention also has application to a digital processing circuit where an accurate check is made on a data manipulation where a multi-bit code is converted to a single electrical bit occurring at a predetermined time. Even though the bit identity of the code is lost, it is nevertheless possible to provide an accurate check of the data manipulation.

Another object of the invention is then to provide a new and improved checking circuit for a data manipulating circuit where the coded data is changed from a multi-bit code to a single bit occurring at a predetermined time.

A typical printer which has been used as a "line-at-a-time" printer is one having a rotating drum with the characters to be printed formed on the peripheral surface of the drum in a plurality of rows and columns. A printer using such a rotating drum as this may be arranged to operate so that a paper on which the printing is to take place is positioned adjacent the rotating drum and a plurality of hammers move in synchronism with the characters on the drum and in accordance with the characters selected to be printed to produce a suitable printed impression on the paper. A printer typical of this type is illustrated and described in a patent of Leo Rosen et al., bearing Number 2,805,620, issued September 10, 1957. In such a printer, a complete line of print is normally associated with a full rotation of the drum of the printer.

The printing of a character by a printer of the above type may be effected by a single electrical pulse which is related in time to the operation of the print wheel or drum. In such a printer, the initial form of code which may comprise a plurality of bits may change to a single pulse occurring at a particular time. To check such an apparatus, as taught by the present invention it is necessary to recreate from the single pulse a multi-bit code in a manner which will permit a checking of the recreated code with the initial input code.

It is accordingly a further more specific object of the present invention to provide a new and improved checking circuit for a printer apparatus having an input code of a first form which is converted to a second form and is then reconstructed to the first form.

The foregoing objects and features of novelty which characterize the invention as well as other objects of the invention are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
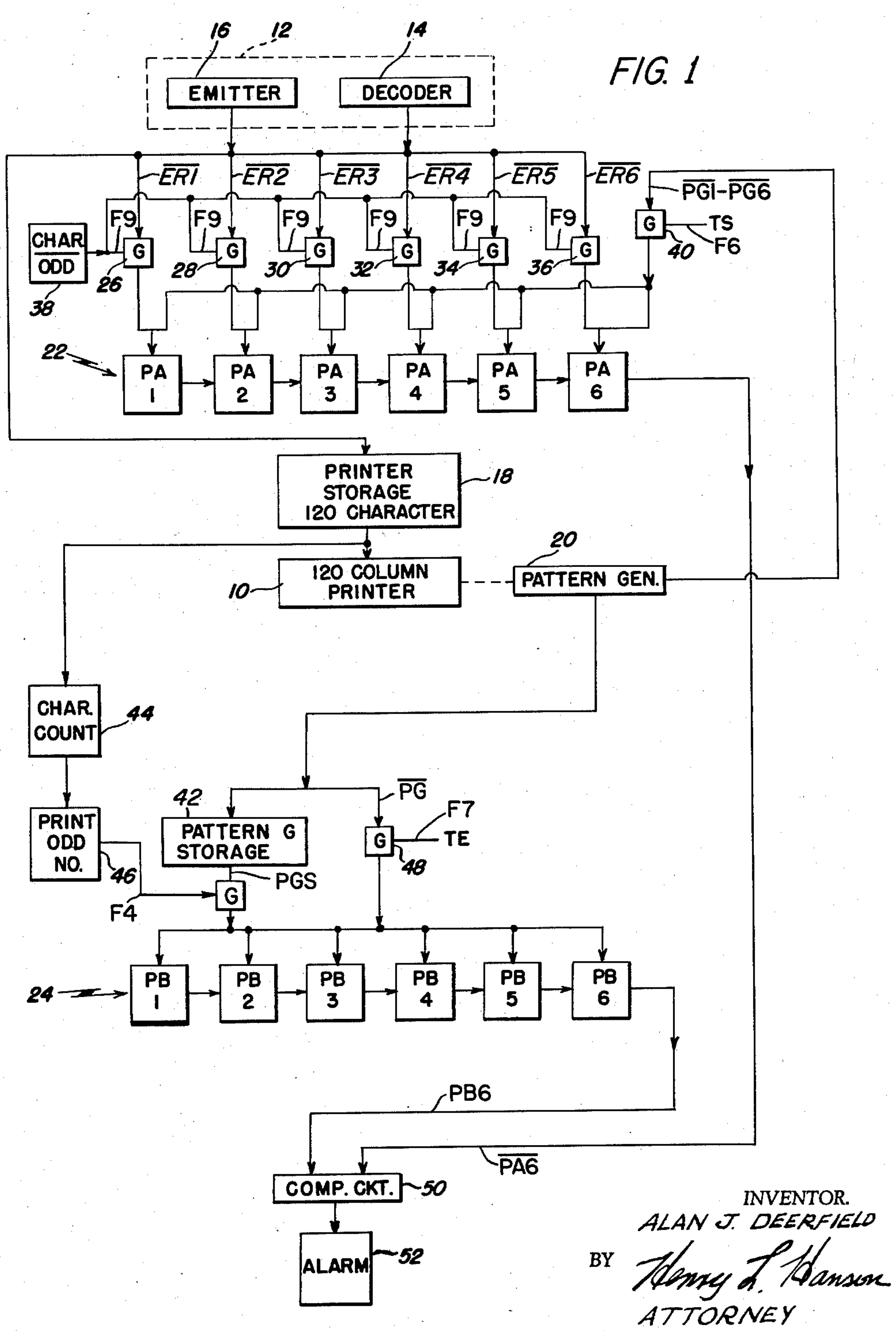
Figure 1 is a diagrammatic representation of the overall system circuitry associated with the present checking scheme.

Referring first to Figure 1, the numeral 10 identifies in block form a printing device which may well be of the type described in the above mentioned Rosen et al. patent. This printer is assumed here to be a line-at-a-time printer which incorporates a rotating drum having formed on the surface thereof a plurality of characters in prearranged columns and rows. The selection of a particular character in a line of print will be made by appropriately actuated electrical hammers which effect a suitable printing of the embossed character on the surface of the drum onto a print receiving medium.

Data for actuating the printer 10 may be derived from a suitable data source 12. The data source 12 may comprise a suitable data decoder 14 which is adapted to take one preselected digital code and convert it into a code compatible with the code associated with the printer. Further, the data source may take the form of a character emitter 16 which may well be suitable circuitry manually plugged to select particular characters for printing in a manner well known in the art. The digital characters received from the emitter 16 and decoder 14 are generally stored in a suitable storage circuit 18 and arranged in a predetermined format for the particular line to be printed. In a copending application of Alan J. Deerfield et al. entitled "Information Handling Apparatus," filed September 26, 1958, and bearing Serial Number 763,563, there is disclosed circuitry which is useful in arranging the digital data for a particular line in selected fields in accordance with a predetermined manually plugged scheme. Such apparatus as disclosed in this last mentioned application is well adapted for use with the present described checking circuitry.

Once a particular line of print has been suitably stored in the printer storage circuitry 18, a print out operation commences and the characters to be printed are appropriately selected in sequence in accordance with the order in which the characters appear on the surface of the printer drum. In order to effect the desired synchronization between the operation of the print wheel or print drum, there is provided a pattern generator 20 which is adapted to produce in coded digital form characters corresponding to the characters appearing in sequence on the surface of the print wheel or drum. When there is a predetermined matching of the character generated by the pattern generator with a particular character in print storage, a signal will be supplied to the printer so that the printing may take place. A representative showing of a pattern generator operating in conjunction with the print storage circuits will be found in a copending application of Alan J. Deerfield entitled "Electrical Apparatus," said application having been filed August 4, 1958, and bearing Serial Number 752,857. Reference should be made to this last mentioned application in order to understand more fully the nature of the operation of the print storage circuits and the pattern generator insofar as providing signals for driving the printer is concerned.

The digital code associated with the described circuitry is assumed to be a six bit alpha-numeric code which is capable of defining a plurality of alphabetic characters and numerical digits. The checking in the present circuitry is achieved by a pair of accumulator or adder circuits 22 and 24. Each of these adder circuits 22 and 24 include six separate adder or accumulator stages which correspond to the six bits of the code being handled by the apparatus. Thus, the adder section 22 includes a plurality of stages PA1, PA2, PA3, PA4, PA5 and PA6. The gating of information into the adder circuit 22 is controlled by a plurality of gates 26, 28, 30, 32, 34 and 36. The controlling of the gates 26 through 36 is achieved by way of suitable signal source 38 which is adapted to open the gates each time an odd number of a given character are being processed for printing in a given line of print. The other inputs to the gating sections 26 through 36 are derived from either the emitter 16 or the decoder 14 and will take the form of a six bit code representing a character which is to be processed.

In one embodiment of the invention, the adder stages PA1 through PA6 each were adder or accumulator stages operating modulo 2 without carry. Each stage, as illustrated, is adapted to operate on a different level of the six levels in the code and thereby accumulate, modulo 2, a number of bits that are processed through the input gates 26 through 36. As long as an odd number of characters are being processed of any particular character, the gating circuits 26 through 36 are open. If an even number of characters are processed insofar as a particular character is concerned, the gates 26 through 36 are not opened. The reason for this will be apparent when it is noted that the adding of the bit positions of an even number of characters having the same code will result in no change in the setting of the modulo 2 adder sections PA1 through PA6.

An additional code pattern is adapted to be gated into the adder stages 22 by way of the gate 40. The character associated with the gating circuit 40 will be a character derived from the pattern generated 20 and is adapted to be selectively gated into the adder 22 at an appropriate time T which is directly related to the print cycle of the printer 10.

The adder 24, considered more specifically, comprises six adder or accumulator stages PB1, PB2, PB3, PB4, PB5 and PB6. Each of these adder stages is adapted to operate or accumulate modulo 2 in the corresponding level of the bit positions of the characters applied to the input thereof. The input characters are derived from the pattern generator 20 and are appropriately gated into the adder stages from a pattern generator storage circuit 42. The gating in the pattern generator storage circuit is controlled by a suitable counter circuit 44 which is connected to count the number of any particular character that has been printed in the course of a print out of a single line of print at the printer 10. If an odd number of characters had been printed, a gating signal source 46 produces a signal indicating that the particular character in the pattern generator storage circuit should be inserted into the adder 24.

A further gating circuit 48 is adapted to gate a character into the adder circuits 24 from the pattern generator 20. This gating circuit 48 is controlled by a timing signal TE which defines the end of a particular print cycle.

After a particular print cycle has been completed, it is desired that a comparison be made between the accumulated results in the adders 22 and 24. For this comparison, there is provided a suitable comparison circuit 50 which is adapted to receive data shifted serially, and simultaneously, from the adder circuits 22 and 24. In the event that the results in the two adder circuits 22 and 24 are not identical, the comparison circuitry 50 will provide a suitable signal for actuating an alarm 52.

Figure 2:
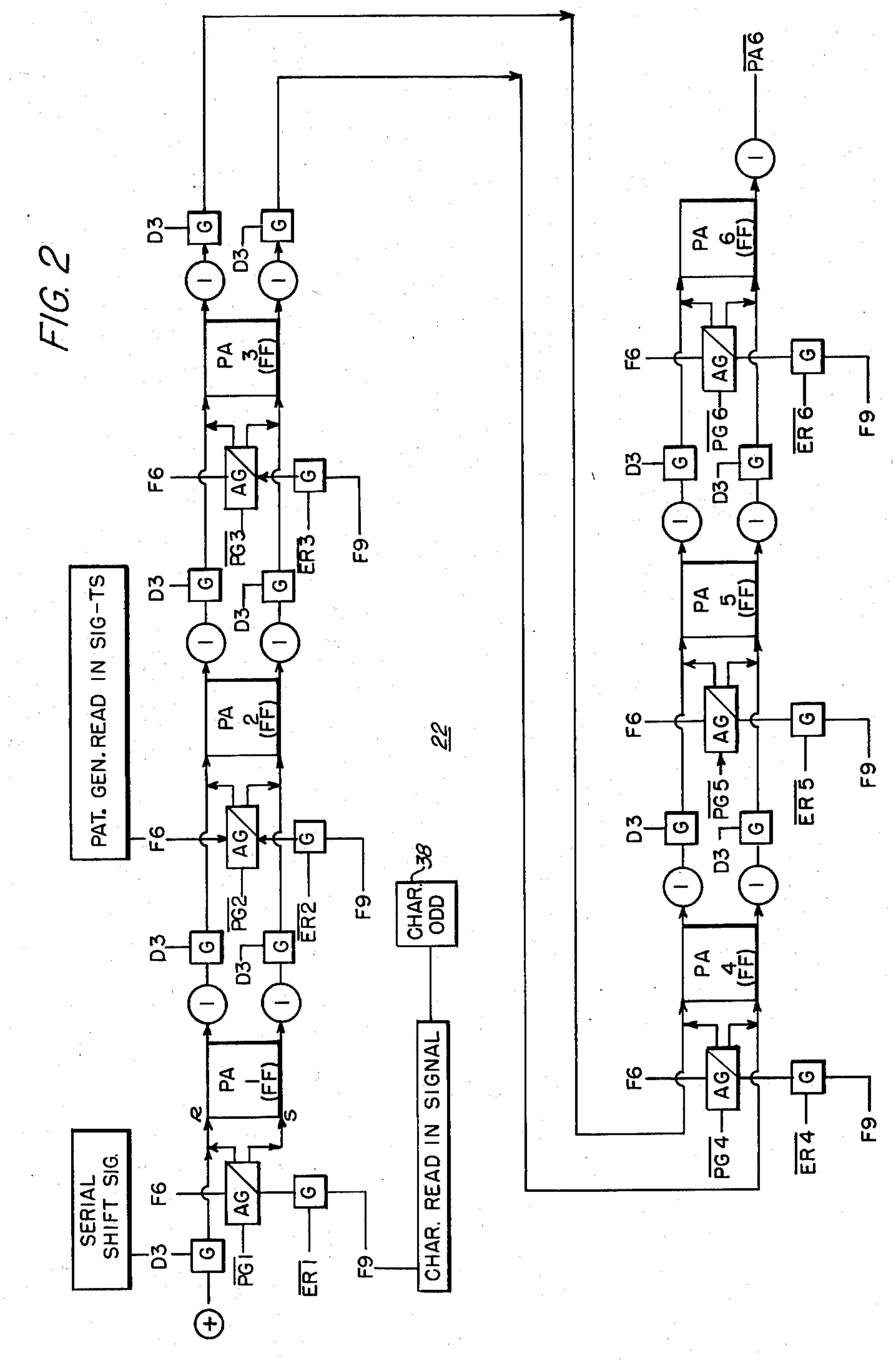
Figure 2 illustrates one of the adder or accumulator circuits associated with one portion of the checking circuitry.

Referring next to Figure 2, the detail of the adder or accumulator circuit 22 is illustrated in logical form. Here, the individual adder stages PA1 through PA6 are illustrated as binary flip-flops which are adapted to operate modulo 2 without carry in an accumulating sense with respect to bits that are applied to their inputs. Each of the accumulator stages PA1 through PA6 has on its input an accumulator gate AG. By definition, this accumulator gate AG is adapted to produce an output to change the binary state of the associated flip-flop PA if there is an F6 timing signal in combination with a print generator signal PG. Further, connected to the accumulator gate AG is a second gate having a timing signal F9 applied thereto as well as a signal representing a particular bit position from an emitter register ER. The timing signal F9 is directly related to the timing for drop-in of a character from the input character register ER.

The accumulator gate AG and the gate G are functionally the equivalent of two separate gates which are buffered together at their outputs to control the switching of the associated flip-flop PA. Representative circuitry for implementing this type of logic is well known in the art and a reference showing such may be found in the book by R. K. Richards entitled "Arithmetic Operations in Didigtal Computers," Van Nostrand Co., Inc., 1955, noting particularly chapter 2.

In order to shift the information out of the register, there are provided a plurality of gates having as the shift signals therefore a timing signal D3. The D3 timing signals are applied to the input gates on all of the coupling lines between the respective PA stages so that when the D3 signals are applied the information in the stages may be shifted serially from the low order stage PA1 out through the high order stage PA6 and then to the comparison circuitry illustrated in connection with Figure 4. The inverters I, on the output of each of the flip-flop output lines are required inasmuch as the logic used is negative logic.

During the normal transfer of characters from the input source 12, of Figure 1, into the printer storage circuit 18, the information will be handled a character at a time and these characters will, in the course of the transfer, be inserted into the adder stage 22 by way of the ER inputs and the gates having the character readin signal F9 applied thereto. The signals passed through the respective input gates and the accumulator gates will then be applied to the stages PA1 through PA6 in accordance with whether or not a one may exist in any particular code position or bit position of the character being processed. If an odd number of characters are being processed, as indicated by a signal from the circuit 38, the F9 signal will be present and the character, of which there are an odd number for a particular line of print, will be dropped into the stages PA1 through PA6 in accordance with the particular code for that character. If there were an even number of characters, the F9 timing signal will not open the respective gates for the register inputs ER and consequently the character will not be inserted into the respective PA adder stages.

At the start of any particular printer cycle, the print wheel or print drum on the printer 10 may have a pretermined character in print position. At the time that it is desired to start a printing cycle, the particular character which is then in a printing position may be selected to define the start of the printing cycle. The timing signal TS will be used to create the signal F6 shown in Figure 2 which will permit the insertion into the stages PA1 through PA6 of the particular character in the printing position as indicated by the output of the print or pattern generator 20.

Figure 3:
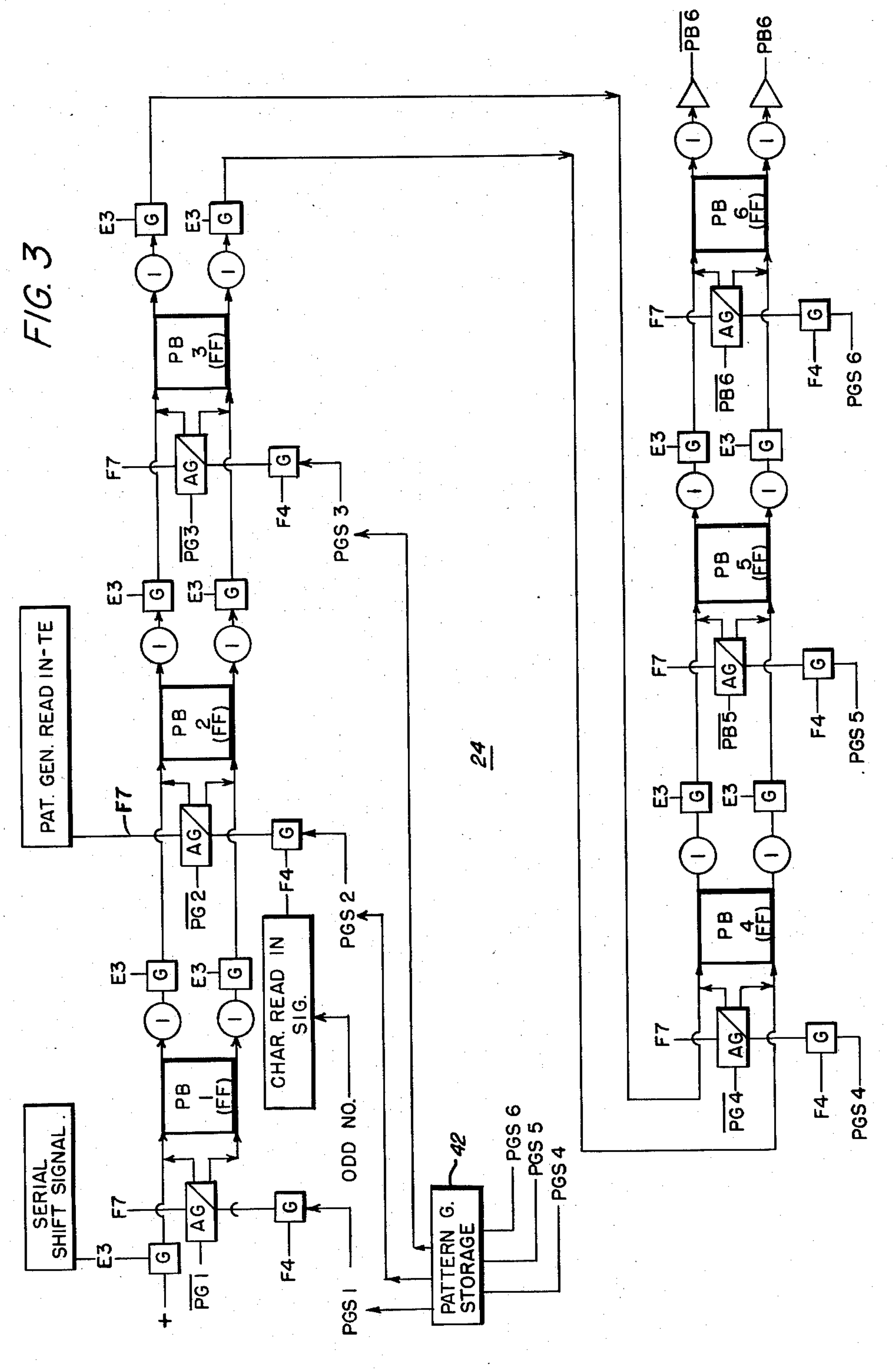
Figure 3 illustrates a further adder or accumulator section associated with a further portion of the present checking circuitry.

The circuitry of Figure 3 illustrates the logical detail of the adder stage 24 associated with the output of the printer. This adder stage is basically the same as that of the adder stage 22 as illustrated in Figure 2 and will be seen to comprise a series of six flip-flops PB1 through PB6 connected with input gates corresponding to the input gates used in Figure 2. In Figure 3, the serial shift signal source is a signal E3 and this signal is utilized for shifting serially the data which has been accumulated in the respective adder sections PB1 through PB6 to the output terminals of the high order stage PB6 and thence to the adder comparison circuits of Figure 4.

The timing signal associated with the character readin from the pattern generator storage register 42 produces the signal F4. This timing signal is appropriately synchronized with the operation of the pattern generator storage circuit 42 so that when a predetermined character has been selected and resides in the print generator storage circuit 42, the character can then be inserted into the adder circuits illustrated in Figure 3. This insertion will be by way of the accumulator gates AG on the input of the respective adder stages PB.

At the end of a printer cycle, the timing signal TE, as illustrated in Figure 1, creates the pattern generator readin signal F7. This F7 signal acts on the respective accumulator gate AG and will permit the gating in of the pattern generator signals PG into the respective stages in accordance with their level in the code. If the circuit has operated properly, the character from the pattern generator dropped into the adder cricuit 22 in Figure 2 at time TS will be the same character as is dropped into the adder circuit 24 at the end of the cycle as defined by the timing signal TE.

Figure 4:
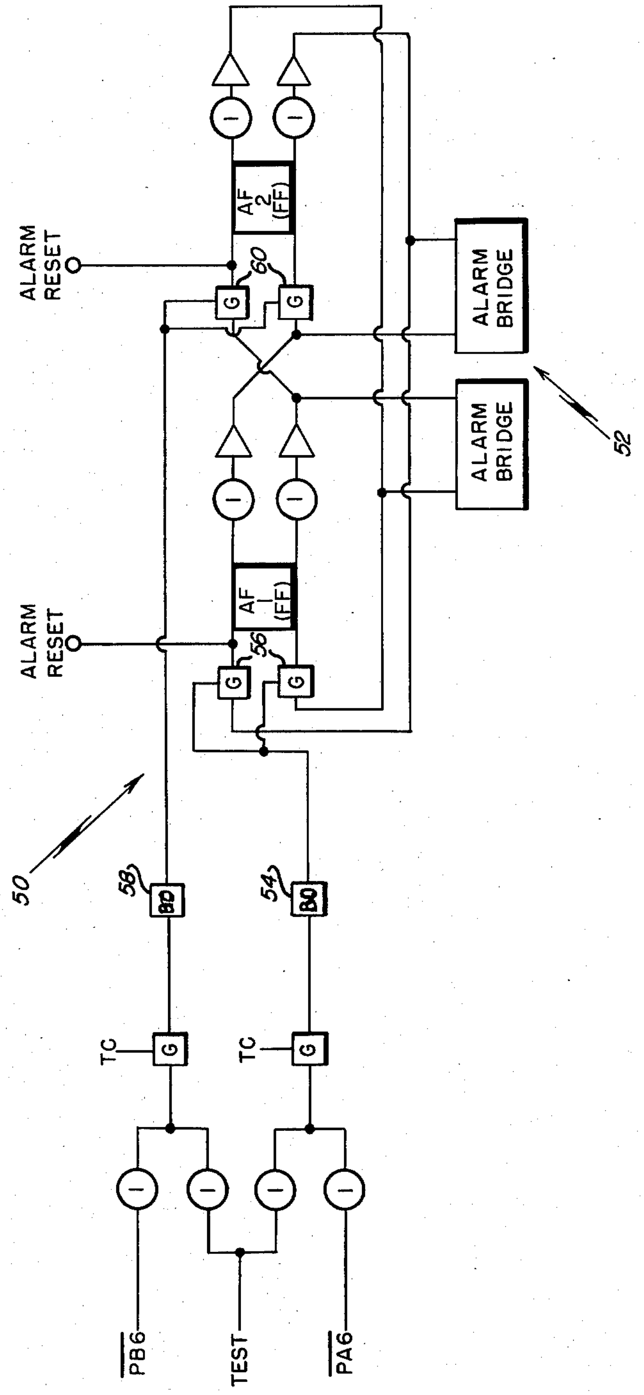
Figure 4 illustrates circuitry which may be used for comparing the checking data stored in the two accumulators of Figures 2 and 3.

It will thus be seen that if the character has been inserted in both of the adder circuits of Figure 2 and Figure 3, even though at different time, the net result in the adders should not be different at the time that a readout is effected to the comparison circuits of Figure 4.

Referring to Figure 4, there is here illustrated a representative checking circuitry in which it is possible to make a comparison of the outputs of the adders 22 and 24 of Figures 2 and 3 respectively. The inputs are applied by way of the terminals $\overline{PB6}$ and $\overline{PA6}$ and are appropriately combined with a test signal and applied to a pair of gates having a timing check signal TC applied thereto. For each bit serially shifted out of the adder circuit 22, a bit will be passed through to a blocking oscillator 54, the latter of which supplies a signal to a pair of gating circuits 56 on the input of a flip-flop AF1.

The output of the adder 24 of Figure 3 which takes the form of a $\overline{PB6}$ signal will create a pulse in a blocking oscillator circuit 58 when each one bit is transferred. The output of this blocking oscillator will be applied to a pair of gates 60 on the input of a flip-flop AF2.

The outputs of the flip-flop AF1 are connected to input gate legs on the gates 60 while the outputs of the flip-flops AF2 are connected to the input gate legs of the gate 56 on the input of the flip-flop AF1. The outputs of the two flip-flops each include a pair of inverters which condition the signals for proper phase relationship with respect to the inputs of the opposite pair.

In operation, the flip-flops AF1 and AF2 are normally switched into the reset state after the alarm reset has been actuated. Each time that the signal TC is present to condition the input of the circuit for the passing of the outputs of the two adder circuits 22 and 24, each bit received in the respective blocking oscillators 54 and 58 produce pulses on the gating circuits of the two flip-flops so that they will alternately switch from one stable state to the opopsite stable state each time a pulse is received. In the event that there should be a lack of time identity of the pulses received from the two adders, one of the flip-flops will be switched while the other will not. Should this event occur, an appropriate alarm circuit is connected to the outputs of the two flip-flops and will produce a suitable indication of the fact that an error condition exists. The alarm bridge circuits may well be of the type illustrated in the above mentioned copending application of Alan J. Deerfield. It will be apparent, however, that other forms of comparison checking circuits may be used to check the identity of the sums that have been accumulated in the respective adder stages in the adders 22 and 24.

Considering next the overall system operation insofar as the checking circuit is concerned, it is assumed first that, referring to Figure 1, the adder circuits 22 and 24 are each reset to a predetermined state. At the start of a particular print cycle, upon the occurrence of the timing signal for starting TS, the character then coming up on the print wheel for printing will be inserted into the adder circuits for the adder 22.

Information which is to be printed in the particular line of print will be derived either from the decoder circuit 14 or the emitter 12 until the appropriate storage circuits for the printer have been loaded to define a particular line of print. As soon as a particular line of print has been established, the printer will begin to operate and upon receipt of the print cycle start signal TS, the first character of the print wheel will be dropped into the adder 22 by way of the accumulator gates AG as discussed in connection with Figure 2.

During the time that the characters are being transferred into the printer storage circuit 18, the respective characters, when the number of any particular character is odd, will be dropped into the adder circuits of the adder 22 where the corresponding bits, where a one is present, will be added modulo 2.

As the printer operates after the timing cycle or the printing cycle has been initiated, each character printed, where the number of characters is odd, the corresponding character produced by the pattern generator, and stored in the pattern generator storage circuit 42 will be dropped into the adder circuits 24 where again corresponding bit positions will be added modulo 2 in the respective stages of the adder.

At the end of the printing cycle, the last character up on the print wheel should correspond to the first character which was dropped into the adder 22 by the timing signal TS. Consequently, when the TE signal signifying the end of the timing period has been received at the gate 48, the character signals from the pattern generator will be dropped into the adder circuits 24 in the manner discussed above in connection with Figure 3.

After the characters associated with a particular line of print have been selected and processed by the printer, the checking operation will be completed by generating serial shift signals in the manner discussed in connection with Figure 2 and Figure 3 whereby the accumulated totals in the adder circuits are shifted serially out to the comparison circuits of Figure 4. As pointed out above, as long as there is a correspond bit by bit relationship existing between the bits in the two adder stages, no error will be indicated. However, if for any reason there is not a correspondence of bits from the outputs of the two adder circuits, either due to a lack of information correspondence or a circuit failure, the alarm bridge will become unbalanced and the alarm circuits will operate.

It will be apparent from the foregoing description that the coded information received at the input of the circuit is in the form of a multi-bit code. In the process of converting this code for use with the printer, a single pulse at a selected time is generated to effect the printing operation. This single pulse is then used to recreate the information in multi-bit coded form so that the entire operation may be checked on a bit-by-bit basis. This check then provides for a very accurate check of the entire data manipulation even though the identity of the original code is effectively lost in the process.

From the foregoing description it will also be readily apparent that the present apparatus provides an accurate check of the transfer of data to an input selection source to an output device on a bit-by-bit basis. Further, the apparatus provides for checking to insure that in any particular print cycle that the print wheel associated with the printing operation has traversed through a single cycle. By utilizing this new and improved checking circuitry, it is possible to achieve a higher degree of accuracy in data manipulating problems, and particularly manipulating problems associated with the operation of a printer.

While, in accordance with the provisions of the statutes, there has been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new and novel and for which it is desired to secure by Letters Patent is:

1. A checking circuit for a data processor comprising a first signal source of digital data pulses defining multi-bit characters to be processed, a first adder comprising a plurality of adder circuits connected to said signal source, each adder circuit being adapted to add the respective bits from different bit positions of each of a plurality of characters from said source, a second signal source of digital data pulses defining multi-bit characters which have been processed, a second adder comprising a plurality of adder circuits connected to said second signal source, each of said adder circuits of said second adder being adapted to add the respective bits from different bit positions of each of a plurality of characters processed from said second source, and comparison means connected directly to said first and second adders to check the performance of said data processor.

2. A checking circuit for a data processor comprising a first signal source of digital data pulses defining multi-bit characters to be processed, a first adder comprising a plurality of adder circuits connected to said signal source, each adder circuit being adapted to add the respective bits from different bit positions of each of a plurality of characters from said source, a second signal source of digital data pulses defining multi-bit characters which have been processed, a second adder comprising a plurality of adder circuits connected to said second signal source, each of said adder circuits of said second adder being adapted to add the respective bits from different bit positions of each of the plurality of characters processed from said second source, and comparison means connected directly to said first and second adders to check the performance of said data processor, said comparison means comprising means for checking the identity of the sums stored in the corresponding bit position adder circuits of said first and second adders.

3. A checking circuit for a data printer comprising a first signal source of digital data pulses defining multi-bit characters to be printed, a first adder comprising a plurality of adder circuits connected to said signal source, each adder circuit being adapted to add the respective bits from different bit positions of each of a plurality of characters from said source, a second signal source of digital data pulses defining multi-bit characters which have been printed, a second adder comprising a plurality of adder circuits connected to said second signal source, each of said adder circuits of said second adder being adapted to add the respective bits from different bit positions of each of the plurality of characters processed from said second source, and adder sum checking means connected to said first and second adders to check the performance of said data processor.

4. In a data processing circuit, the combination comprising a first multi-bit data character signal source whose bits are to be processed a character at a time, a first adder circuit having a plurality of adder stages, each of said stages being adapted to add and store the presence of selected bits in selected character bit positions of each character, a second multi-bit data character signal source having on its output data bits defining characters which have been processed, a second adder circuit having a plurality of adder stages, each of said stages being adapted to add the presence of selected bits of each character bit position of each character which has been processed, and checking means connected directly to said first and second adders to compare the sum in each corresponding adder stage of said first and second adders.

5. In a data processing circuit, the combination comprising a first multi-bit data character signal source whose bits are to be processed by discreet characters, a first adder circuit having a plurality of adder stages, each of said stages being adapted to add and store the presence of selected bits in selected character bit positions of each character, means connected to said first adder to inhibit the operation thereof with respect to the adding of any character which is processed an even number of times in a given cycle of operation, a second multi-bit data character signal source having on its output data bits defining characters which have been processed, a second adder circuit having a plurality of adder stages, each of said stages being adapted to add the presence of selected bits of each character bit position of each character which has been processed, means connected to said second adder to inhibit the operations thereof with respect to the adding of any character which is processed an even number of times in said given cycle, and checking means connected to said first and second adders to compare the sum in each corresponding adder stage of said first and second adders.

6. In a data processing circuit, the combination comprising a first multi-bit data character signal source whose bits are to be processed a character at a time, a first adder circuit having a plurality of adder stages, each of said stages being adapted to add, modulo 2 without carry, the presence of selected bits in selected character bit positions of each character, a second multi-bit data character signal source having on its output data bits defining characters which have been processed, a second adder circuit having a plurality of adder stages, each of said stages being adapted to add without carry, modulo 2, the presence of selected bits of each character bit position of each character which has been processed, and checking means connected directly to said first and second adders to compare the modulo 2 sum in each corresponding adder stage of said first and second adders.

7. Apparatus for checking the operation of a data printer comprising a character signal source adapted to have multi-bit characters on the output thereof, a printer adapted to print a plurality of like characters at the same time, said printer comprising a drum having a predetermined number of characters on the peripheral surface thereof, a print character generator connected to be synchronized with the operation of said printer, a first adder connected to said character signal source, a second adder connected to said print character generator, said first and second adders adding the presence of selected bits from the bit positions in each character received from the respective character sources, and sum checking means connected to said first and second adders.

8. Apparatus for checking the operation of a data printer comprising a character signal source adapted to have multi-bit characters on the output thereof, a printer adapted to print a plurality of like characters at the same time, said printer comprising a drum having a predetermined number of characters on the peripheral surface thereof, a print character generator connected to be synchronized with the operation of said printer, a first adder connected to said character signal source, a second adder connected to said print character generator, said first and second adders adding bit positions in each character received from the respective character sources, inhibiting means connected to said first and second adders, multiple character sensing means connected to said inhibiting means to selectively inhibit the operation of one or the other of said adders when an even multiple number of characters are to be printed or are printed, and sum checking means connected to said first and second adders.

9. A data manipulating circuit comprising a data input circuit adapted to receive data in a multi-bit form which comprises a plurality of signal representations, a multi-bit reference code generator, a converter connected to said input circuit and adapted to convert multi-bit data into a signal bit comprising a single signal representation occurring at a preselected time, a checking circuit comprising means connected to said converter and to said reference code generator to construct from said single bit a multi-bit code from a code derived directly from said code generator, and comparison means connected to said input circuit and said checking circuit to compare the multi-bit codes received at said input and constructed by said checking circuit.

10. A data manipulating circuit comprising a data input circuit adapted to receive data in a first coded form, a reference data source having an output in said first coded form, a converter connected to said input circuit and said reference data source and adapted to convert said data to a second coded form, a checking circuit comprising means connected to said converter and to said reference data source to construct from said data in said second coded form, data in said first coded form, and data comparison means connected to said input circuit and said checking circuit to compare the data in said first coded form.

References Cited in the file of this patent

UNITED STATES PATENTS

| | | |
|---|---|---|
| 2,281,745 | Buckingham | May 5, 1942 |
| 2,857,100 | Franck et al. | Oct. 21, 1958 |